United States Patent
Schnabel et al.

(10) Patent No.: US 11,367,991 B2
(45) Date of Patent: Jun. 21, 2022

(54) METHOD AND APPARATUS FOR FREQUENCY CONVERSION AND AMPLIFICATION OF LASER RADIATION USING NON-LINEAR MEDIA IN OPTICAL RESONATORS

(71) Applicant: Universität Hamburg, Hamburg (DE)

(72) Inventors: Roman Schnabel, Hannover (DE); Axel Schönbeck, Pinneberg (DE); Sebastian Steinlechner, Hamburg (DE)

(73) Assignee: Universität Hamburg, Hamburg (DE)

( * ) Notice: Subject to any disclaimer, the term of this patent is extended or adjusted under 35 U.S.C. 154(b) by 0 days.

(21) Appl. No.: 17/048,233

(22) PCT Filed: Apr. 15, 2019

(86) PCT No.: PCT/EP2019/059677
§ 371 (c)(1),
(2) Date: Oct. 16, 2020

(87) PCT Pub. No.: WO2019/206879
PCT Pub. Date: Oct. 31, 2019

(65) Prior Publication Data
US 2021/0234329 A1    Jul. 29, 2021

(30) Foreign Application Priority Data
Apr. 16, 2018  (DE) ...................... 10 2018 108 953.8

(51) Int. Cl.
*H01S 3/00* (2006.01)
*H01S 3/131* (2006.01)
(Continued)

(52) U.S. Cl.
CPC ............ *H01S 3/1317* (2013.01); *G02F 1/353* (2013.01); *H01S 3/0092* (2013.01); *H01S 3/0401* (2013.01); *H01S 3/08059* (2013.01)

(58) Field of Classification Search
CPC .. H01S 5/0092; H01S 5/0401; H01S 5/08059; H01S 5/137; G02F 1/353
See application file for complete search history.

(56) References Cited

U.S. PATENT DOCUMENTS

| | | |
|---|---|---|
| 5,898,718 A | 4/1999 | Mohatt et al. |
| 10,534,205 B2 | 1/2020 | Kießling et al. |
(Continued)

FOREIGN PATENT DOCUMENTS

| | | |
|---|---|---|
| DE | 102008025588 A1 | 12/2009 |
| DE | 102014017931 B3 | 3/2016 |
| EP | 3299884 A1 | 3/2018 |

OTHER PUBLICATIONS

Joanna A. Zielinska et al.; "Fully-resonant, tunable, monolithic frequency conversion as a coherent UVA source"; Optics Express; Jan. 23, 2017; vol. 25, No. 2 (9 pages).
(Continued)

*Primary Examiner* — Michael Carter
(74) *Attorney, Agent, or Firm* — Barclay Damon LLP

(57) ABSTRACT

A device for generating laser radiation comprises a temperature-controlled optical setup comprising an optically non-linear solid state medium arranged in a resonator and an active region. The outgoing laser radiation is generated from a pump beam introduced into the optically non-linear solid state medium. A first temperature actuator and a second temperature actuator configured to independently adjust temperature values in the active region of the optically non-linear solid state medium. The first temperature actuator is configured regulate a length of the resonator by setting a first temperature value within a first portion of the active region. The second temperature actuator is configured to match phases of wavelengths generated by the outgoing laser radiation and phases of wavelengths of the pump beam
(Continued)

radiation by setting a second temperature value within a second portion of the active region.

18 Claims, 8 Drawing Sheets

(51) Int. Cl.
    *H01S 3/04*         (2006.01)
    *H01S 3/08*         (2006.01)
    *G02F 1/35*         (2006.01)

(56) References Cited

U.S. PATENT DOCUMENTS

| | | | |
|---|---|---|---|
| 2010/0165453 A1 | 7/2010 | Morikawa et al. | |
| 2011/0243161 A1* | 10/2011 | Tucker | G02F 1/3525 |
| | | | 372/21 |
| 2017/0307956 A1 | 10/2017 | Georges et al. | |

OTHER PUBLICATIONS

Universität Hamburg; PCT/EP2019/059677; International Filing Date Apr. 15, 2019; English Translation of International Search Reported; dated Jul. 16, 2019 (2 pages).

\* cited by examiner

METHOD AND APPARATUS FOR FREQUENCY CONVERSION AND AMPLIFICATION OF LASER RADIATION USING NON-LINEAR MEDIA IN OPTICAL RESONATORS

This application is a national stage application pursuant to 35 U.S.C. § 371 of International Application No. PCT/EP2019/059677, filed on Apr. 15, 2019, which claims priority to, and benefit of, German Patent Application No. 10 2018 108 953.8, filed Apr. 16, 2018, the entire contents of which are hereby incorporated by reference.

TECHNICAL FIELD

The invention relates to a method and a device for generating laser radiation by means of a temperature-controlled optical setup. In particular, these serve to convert the frequency and amplify laser radiation by means of non-linear media in optical resonators.

BACKGROUND

Optical resonators containing nonlinear media generate radiation of one or more new wavelengths from one or more pump waves entering the resonator. Through this conversion, laser radiation can be generated whose wavelength differs from the wavelength of the incident pump wave and, in particular, lies outside the wavelengths of available, active laser media. The power of an incident signal beam can also be amplified by a pump beam of another wavelength. In both cases this is an optically nonlinear process. A corresponding setup usually consists of an optically nonlinear solid state medium, especially a crystal, in an optical resonator. The incident pump beam and, if required, the signal beam are focused into the solid state medium. The nonlinear solid state medium must ensure phase matching between all incident and newly generated wavelengths. Otherwise, the efficiency of the conversion or amplification process is low. By the optical resonance of single or better of all involved wavelengths the efficiency of the processes is further increased and/or reaches usable values at all. Phase matching is usually achieved by adjusting the (material-dependent) phase matching temperature of the solid state medium. At the phase matching temperature there is constructive interference of the desired nonlinear process regarding the partial waves, which are generated at different locations in the solid state medium along the propagation of the light. At this temperature, the refractive indices of the crystal are nearly the same for all wavelengths involved (but not identical, since the Gouy phase resulting from focusing still has to be compensated).

The resonator can, for example, be created by two mirrors between which the nonlinear solid medium is placed. The mirrors reflect the incoming wave fronts back exactly into themselves, so that the light can in principle circulate infinitely often in the resonator. For an optical resonator to be resonant for a certain wavelength, its optical orbital length must be a multiple of the wavelength. A very stable and especially low-noise method involves adjusting the optical length of the resonator via its temperature. The coefficient of thermal expansion and/or the temperature dependence of the refractive index of the solid medium through which the light passes is used. The problem with this method is that, as a rule, each wavelength requires a different temperature (among other things due to the necessary focusing and the resulting difference in Gouy phases) in order to realize its respective optical resonance. These also differ from the phase matching temperature. For this reason, in optical resonators with nonlinear solid state media (hereinafter referred to as nonlinear resonators), phase matching is usually realized via temperature and resonance by changing the length of the resonator via a piezo actuator. However, this method has several disadvantages. First, the resonator can only be adjusted resonantly for one wavelength by a piezo actuator. Second, the piezo actuator is usually operated with high voltage, which requires protective measures and also—due to the usually very noisy high voltage—leads to a noise of the resonator length set by the piezo actuator.

In the publication Zielinska et al., "Fully-resonant, tunable, monolithic frequency conversion as a coherent UVA source", Opt. Express 25, 1142-1150 (2017) a partitioned solid state resonator is described. The resonator is monolithic, i.e. it is formed by mirror surfaces applied to opposite ends of the solid state medium. The resonator has three partitions arranged one behind the other along the laser beam, with only one central partition acting non-linearly, i.e. being active. This active, middle partition is operated at the phase matching temperature. The non-active partitions arranged on opposite sides of the middle area can be tempered independently of each other, whereby the resonance condition for the red pumping light is to be set. This is to achieve independent control of phase matching and resonator length. According to Zielinska, to maintain sufficient efficiency, the temperature must be kept constant at the phase matching temperature over the entire active area, which is difficult to achieve due to the adjacent partitions of diff rent temperature. Therefore, Zielinska considers it necessary to keep the temperatures of the non-active partitions only slightly different from the temperature set in the active partition. However, this has the consequence that in order to achieve the resonance condition for the red pump light, additional pressure must be applied to the solid state medium via a piezoelectric element.

U.S. Pat. No. 5,898,718(A) describes a nonlinear solid state medium within which different temperatures can be adjusted to optimize the output intensity of different harmonic frequencies. A resonator is not used in the current invention. Rather, the objective of the invention is to provide a nonlinear resonator as well as a method for its operation, which allows an efficient operation with a simple and compact realization of the resonator.

BRIEF SUMMARY OF THE INVENTION

In an embodiment, a method for generating laser radiation by means of a temperature-controlled optical setup comprises an optically non-linear solid state medium arranged in a resonator and having an active region. The pump beam introduced into the solid state medium, supported by constructive interference, generates outgoing laser radiation, characterized by adjusting the resonator length by setting or adjusting a first temperature value within a first section of the active region and matching the phases of the wavelengths generated and involved in the generation of the laser radiation by setting or adjusting a second temperature value within a second section of the active region.

In an embodiment, a device for generating laser radiation according to the invention comprises a temperature-controlled optical structure with an optically non-linear solid state medium arranged in a resonator and having an active region. The structure is configured to generate outgoing laser radiation from pump radiation introduced into the solid state medium, supported by constructive interference. At least two temperature actuators are configured to independently adjust temperatures in the active region of the solid state medium, wherein a first temperature actuator is adapted to adjust the resonator length by setting a first temperature value within a first portion of the active region. A second temperature actuator is adapted to match the phases of the wavelengths generated and involved in the generation of the laser radiation by setting a second temperature value within a second portion of the active region.

In an embodiment, the solid-state medium is a crystal. The active region denotes the non-linearly reacting region of the solid state medium, i.e. the region in which the relationship between the electric field and electric polarization is non-linear. In particular, the active region can represent a periodic polarized nonlinearity. The resonator can, for example, be a standing wave resonator, in particular with deflection mirrors or other additional optical components, or a travelling wave resonator, in particular a ring resonator. The resonator can, for example, be triangular or folded ("bow-tie" configuration). The temperatures can be realized for example by Peltier elements, ohmic heating elements or by absorption of additional incident light arrays of other wavelengths. The temperature actuators can therefore be designed as Peltier elements, ohmic heating elements or as sources of light fields of other wavelengths. The optical setup can especially form or comprise an optical parametric oscillator.

According to an embodiment, it is intended to set different temperatures within the active, i.e. the non-linearly reacting, region of the solid state medium. In the second section of the active region, the phase matching temperature is set, whereby the wavelengths involved in the generation of the laser radiation are brought into phase. In the first section of the active region, a temperature is set which ensures that the resonance condition is reached for one or more of the wavelengths involved in the generation of the laser radiation. This is achieved, as mentioned above, by changing the length of the resonator due to thermal expansion or contraction, or by changing the optical path length due to the temperature dependence of the refractive index of the solid state medium. It may be intended to set further temperatures within the active region, e.g. by means of further temperature actuators, which can be used especially to achieve the resonance condition for further wavelengths. For example, the resonator length can be adjusted by setting or adjusting a third temperature value within a third section of the active region to achieve the resonance of another, second wavelength, as will be explained later.

The invention is based on the realization that not the entire active region of the nonlinear resonator has to be kept at the phase matching temperature to ensure efficient generation of laser radiation. It was recognized that the generation of new frequencies from the incident pump beam takes place essentially near the beam waist (i.e. in the focus) and that phase matching is therefore only necessary in the area of this beam waist. At other points of the solid state medium, however, different temperatures can prevail, even if they lead to a phase mismatch of the involved wavelengths. Consequently, optimal phase matching is only important in those zones of the solid state medium where the laser light comprises a high intensity. At areas of lower laser intensity, the temperature in the nonlinear solid state medium can deviate from the phase matching temperature without a significant negative influence on the frequency conversion. The invention enables both phase matching and resonance, i.e. the resonator length, to be adjusted via the temperature. As explained, the temperature is only adjusted within the active region. The resonator according to the invention is therefore particularly compact. In particular, the active region can extend over the entire solid-state medium, which means that there are no non-active zones surrounding the active region (as with Zielinska), which in turn allows a particularly compact resonator and also simplifies manufacture. In addition, piezoelectric elements for adjusting the resonator length can be dispensed with, which avoids the associated disadvantages explained above. In particular, the resonator can be designed monolithically, with two mirror surfaces applied to opposite ends of the solid state medium, as will be explained later. In addition, the first temperature and/or the second temperature can be controlled to a setpoint value to take into account any change in the frequency of the pump beam, as will be explained later.

In an embodiment, the method according to the invention can be carried out with the device according to the invention. The device according to the invention is suitable for carrying out the method according to the invention. Specifications of the method as well as the device are jointly explained in the following.

According to an embodiment, the active region extends over the entire solid state medium. Consequently, the solid state medium can consist exclusively of the active region, i.e. the nonlinear region. In particular, the solid state medium can be completely (periodically) poled. As it is possible to set different temperatures even within the active region of the solid state medium, as explained above, non-active regions are not necessary. The solid-state medium and thus the resonator can thus be made more compact, especially compared to the design shown by Zielinska. In addition, the production of the solid state medium is also simplified, since a piece of any length can be cut out of a uniform crystal material and used.

According to an embodiment, the resonator comprises two resonator mirrors arranged at opposite ends of the solid state medium. The resonator mirrors can be connected to the solid-state medium, especially applied to it, or arranged separately from it. In particular, the resonator mirrors can be arranged separately from the solid-state medium at a fixed distance. The resonator mirrors reflect the waves involved in the generation of the laser radiation as well as newly generated waves. In doing so, all revolutions of one wavelength are constructively superimposed upon each other.

According to a further embodiment, the resonator mirrors are applied as mirror surfaces on the outside of the opposite ends of the solid state medium. The optically nonlinear solid state medium and the mirror surfaces thus form a monolithic resonator. This makes the resonator particularly compact, easy to manufacture, and more stable in operation due to the absence of piezoelectric actuators. Thus, a resonator length regulated by temperature can be maintained more reliably than a resonator length regulated by a piezo actuator, since in the latter case the resonator length is noisy due to noise from the high voltage supplying the piezo actuator, as explained at the beginning. The opposite ends of the solid state medium, which are provided with the mirror surfaces, are preferably convex, especially spherically polished. As is well known, the diameter of the laser beam must change in an optically stable resonator. If the beam waist (the focus) is assumed to be in the center of the solid state medium, the laser beam is expanded in both directions along a main beam axis starting from the beam waist. The convex ends of the solid-state medium ensure that the mirror surfaces are always perpendicular to the direction of propagation of the radiation, so that the expanding laser beam is completely deflected back into the solid-state medium. For a monolithic resonator, the separate adjustability of three different temperatures is particularly useful, as will be explained later.

According to another embodiment, the resonator mirrors are constructed separately from the solid state medium, whereby at least one adjusting element is provided for adjusting the distance of at least one of the resonator mirrors to the solid state medium. The actuator can, for example, comprise one or more piezoelectric actuators. In particular, two actuators can be provided, a first actuator controlling the distance of a first resonator mirror to the solid state medium and a second actuator controlling the distance of a second resonator mirror to the solid state medium. The resonator length can thus be additionally controlled via the at least one actuator. In general, the temperature in the solid state medium changes only slowly due to its usually low thermal conductivity. This results in a slow change of the resonator length. Especially when the temperature is controlled, as will be explained later, the resonance condition is only slowly reached. A control element configured in the above manner, especially with piezo actuators, allows a very fast adjustment of the resonator length. In particular, the resonator length can then be quickly adjusted to a wavelength change of the incident pump wave. In particular, a different wavelength of the wavelengths involved in the generation of the laser radiation can be brought to resonance via the at least one actuator than via the second temperature. Thus, two wavelengths can be brought to resonance, which increases the efficiency of the conversion or generation of the laser radiation. In addition, the same wavelength of the wavelengths involved in the generation of the laser radiation can be brought to resonance via the at least one control element as via the second temperature. These mechanisms can therefore complement each other. This is particularly useful, since a possibly intended piezo actuator does not then have to be operated with high voltage, thus avoiding the disadvantages already mentioned above. It is true that the piezo actuator can deflect the resonator mirror less when it is not operated with high voltage. However, in addition to the adjustment of the resonator length by temperature, there is enough room for movement to (re)reach the resonance. The ends of the solid medium facing the resonator mirrors can comprise an anti-reflective layer to allow radiation to pass through to and from the respective resonator mirror.

According to another embodiment, a first resonator mirror is applied as a mirror surface on the outside of a first end of the solid state medium and a second resonator mirror is arranged separately from the solid state medium at a second end of the solid state medium opposite the first end, wherein an adjusting element is provided for adjusting the distance of the second resonator mirror to the solid state medium. The resonator can thus—as a combination of the two aforementioned designs—comprise a mirror surface directly connected to the resonator and a mirror arranged at the opposite end. The second resonator mirror is spaced from the second end of the solid-state medium, in particular by an air gap, and can be adjusted by means of a control element, in particular a piezo actuator. The second end of the solid-state medium facing the second resonator mirror may comprise an anti-reflective layer to allow radiation to pass to and from the second mirror. Please refer to the explanations above, in particular, the resonator can be lengthened or shortened both by temperature and by the actuator.

According to an embodiment, the resonator length is adjusted by setting a third temperature value within a third section of the active region. According to a design of this type, at least three temperature actuators can then be provided to set different temperatures in the active region of the solid state medium, the third temperature actuator being designed to adjust the resonator length by setting a third temperature value within a third section of the active region. It may thus be envisaged, in addition to the first temperature within the first section of the active region for adjusting the resonator length and the second temperature within the second section of the active region for adjusting the beam waist for phase matching, to provide a third section with a third temperature, also for adjusting the resonator length. The third temperature may differ from the first temperature in particular. This is especially useful for the monolithic resonator mentioned above, since this allows the resonator to be resonant for two wavelengths. The resonator length can thus be adjusted so that two wavelengths of the wavelengths involved in the generation of the laser radiation reach resonance.

According to an embodiment, the resonator length is adjusted by setting or adjusting a fourth temperature value within a fourth section of the active region. According to this embodiment, at least four temperature actuators can then be provided to set different temperatures in the active region of the solid state medium, whereby the fourth temperature actuator is designed to adjust the resonator length by setting a fourth temperature value within a fourth section of the active region. According to the above explanations, the resonator length for the resonance of a third wavelength can thus be set via the fourth temperature.

According to an embodiment, the first temperature and/or the second temperature is controlled to a setpoint value, which depends in particular on the frequency of the pump beam. According to this design, the device may comprise a control unit for controlling the first temperature and/or the second temperature to a setpoint value, in particular depending on the frequency of the pump beam. An actual temperature in the first and/or second section of the solid medium can thus be measured and compared by the control unit with a setpoint temperature for the first and/or second section, whereby the control unit can be further designed to increase or decrease the first temperature and/or the second temperature in the event of a deviation between the setpoint and actual temperature until the deviation has ceased. Such feedback can be used, for example, to keep the temperatures in the first and/or second section stable in the event of any energy losses. In particular, the control can be made dependent on the frequency of the pump beam, i.e. a target value for the respective temperature can be specified depending on the frequency of the pump beam. In this case the frequency detuning between laser radiation and resonance condition can be determined by the control unit and due to the downing the first temperature and/or the second temperature can be increased or decreased by the control unit until the detuning disappears. Consequently, the respective setpoint value is dynamically adjusted to the changing external conditions. The frequency detuning can be measured and evaluated by known methods, e.g. Pound, Drever and Hall. Such a dynamic is feedback control is useful if the incident laser frequencies or wavelengths change over time, for example, because the pump laser is not stable enough. In this case, the respective target temperature can be continuously adjusted and thus a changing frequency of the pump beam can be taken into account. This ensures an efficient operation especially of monolithic nonlinear resonators. If the optical frequency changes slowly, both the phase matching and the optical resonator length for the involved wavelengths can be adjusted to the changing wavelengths by changing the temperatures. Also possibly further intended temperatures in further sections of the active region can be controlled accordingly.

BRIEF DESCRIPTION OF THE DRAWINGS

Examples of how the invention was implemented are explained below using figures, in the following.

Unless otherwise indicated, identical reference marks denote identical objects.

DETAILED DESCRIPTION OF THE INVENTION

Figure 1:
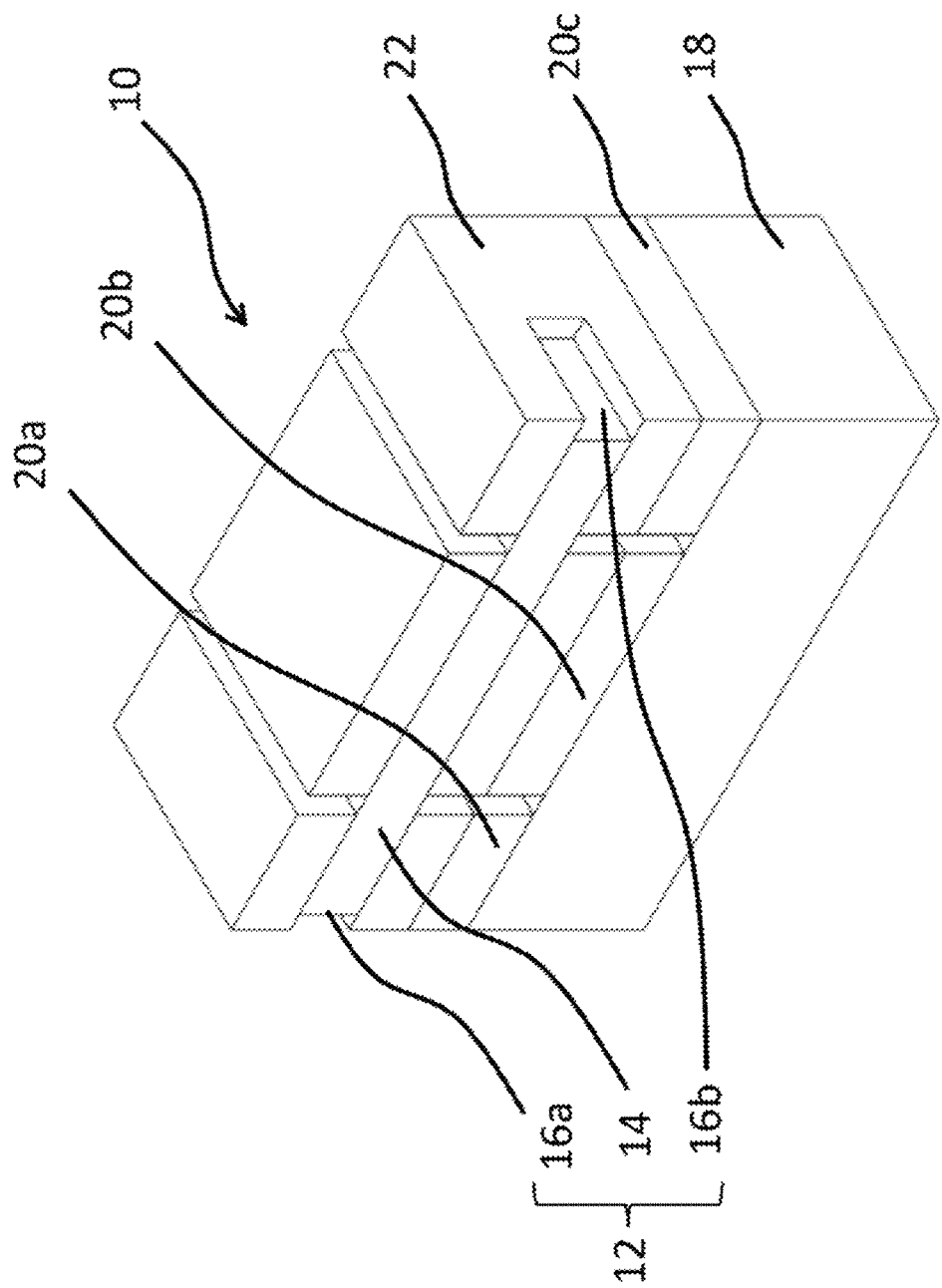
FIG. 1 illustrates a schematic representation of an embodiment of a for generating laser radiation.

FIG. 1 shows a device 10 for generating laser radiation according to the invention. The device 10 comprises a (monolithic) frequency converter or amplifier for laser radiation, which in this case is configured as an optical parametric oscillator 12. It comprises a nonlinear solid state medium 14 with resonator mirrors 16a, 16b, which are applied as mirror surfaces on opposite ends of the solid state medium 14. The solid-state medium 14 has an active region that extends over the entire solid-state medium. The entire solid state medium 14 therefore reacts non-linearly. The mirror surfaces 16a, 16b form a nonlinear resonator 17.1 (FIG. 2) with the nonlinear solid state medium 14. Furthermore, the device 10 comprises a socket 18 serving as a cold or heat reservoir as well as three temperature actuators 20a, 20b, 20c, in particular Peltier elements, for setting temperatures T1, T2, T3 in the section of the nonlinear solid state medium 14 above. The oscillator 12 is also framed in sections by a heat-conducting socket 22 of the device 10. The socket 22 can consist in particular of thermally well conducting materials such as copper, silver, gold or a combination of these. The nonlinear resonator 12 is designed to generate outgoing laser radiation from pump beams introduced into the solid state medium 14, supported by constructive interference. The mode of operation of the nonlinear resonator 17.1 just described is explained below with reference to FIG. 2.

Figure 2:
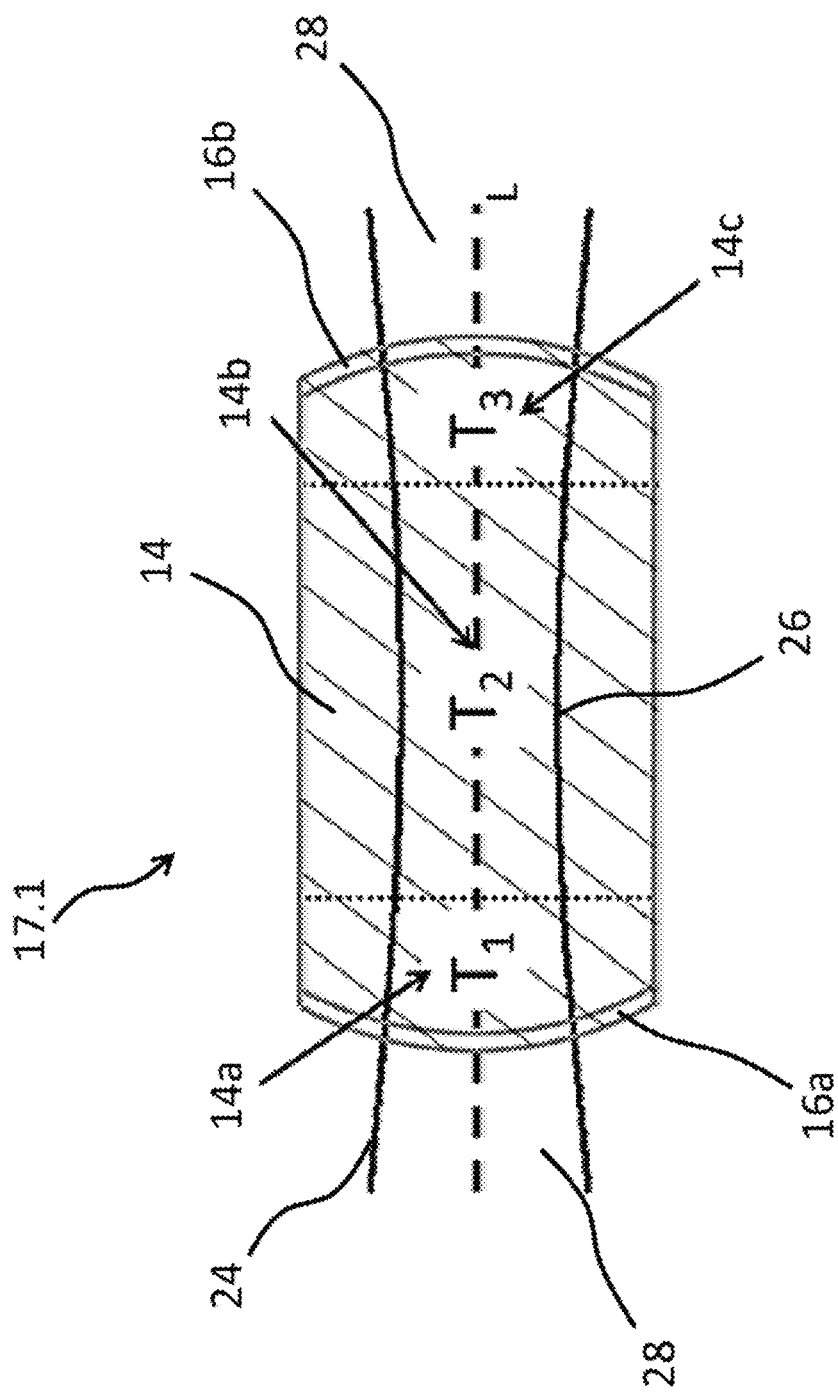
FIG. 2 illustrates a schematic sectional view of an embodiment of a nonlinear resonator.

FIG. 2 shows a rough schematic cross-section through an embodiment of a nonlinear resonator 17.1 with three different temperature zones T1, T2, T3 as shown in FIG. 1. The configuration of the nonlinear resonator corresponds to that of FIG. 1. It can be seen here that both opposite ends of the solid state medium 14, to which the resonator mirrors 16a, 16b are applied as mirror surfaces on the outside, are convexly curved. The curvature is exaggerated here for clarification. It is a monolithic resonator. The active region extends here as well as in all other design examples over the entire solid state medium 14, which thus reacts completely non-linearly. The nonlinear solid state medium 14 in this embodiment consists of three sections 14a, 14b, 14c, whose temperatures can be controlled independently of each other due to the temperature actuators 20a, 20b, 20c (not shown in FIG. 2). The pump beam introduced into the solid state medium 14 generates a laser beam 24 running along a longitudinal axis L of the solid state medium 14, with a beam waist 26 arranged centrally in the middle of the solid state medium 14 and beam sections 28 widening out from the beam waist 26. The diameter of the laser beam 24 consequently varies along the longitudinal axis L, which is necessary for the operation of a stable optical resonator. The convex ends of the solid state medium 14 ensure that the mirror surfaces 16a, 16b are always perpendicular to the direction of propagation of the radiation, so that the expanding beam sections 28 are completely deflected back into the solid state medium 14.

The temperature actuator 20a controls the temperature prevailing in the first section 14a to the value T1. Thus, due to the thermal expansion or the change in the refractive index of the solid state medium 14, the resonator mirror 16a is shifted in the first section 14a and thus the length of the nonlinear resonator 17.1 is controlled in such a way that the resonance condition s fulfilled for a first wavelength of the wavelengths participating in the generation of the laser radiation. The temperature actuator 20b is also used to control the temperature of the second section 14b to the value T2, which corresponds to the phase matching temperature of the wavelengths participating in the generation of the laser radiation. Thus, the phase matching is achieved. Furthermore, according to this design example a third temperature actuator 20c is provided, which controls the third section 14c to the temperature T3. This enables—by shifting the resonator mirror 16b and the associated change in length of the resonator 17.1—the control of a further, second wavelength to its resonance condition. The different wavelengths are reflected at different depths in the resonator mirrors. The temperatures are not only adjusted hereby (as well as in the further design examples), but are also regulated to the respective value by a control procedure explained further down.

As explained above, not the entire active region of the nonlinear resonator—i.e. in this case not the entire solid state medium—has to be kept at the phase matching temperature, since the generation of new frequencies from the incident pump beam essentially takes place near beam waist 26 (i.e. in the focus). Therefore, phase matching is only necessary in section 14b. A temperature deviating from the phase matching temperature in sections 14a, 14c leads to a phase mismatch of the involved wavelengths, but this is relatively harmless. The device according to the invention enables both phase matching and resonance, i.e. the resonator length along the longitudinal axis L, to be adjusted via the temperature. In the described design, resonance can be achieved for two wavelengths. The nonlinear resonator described is particularly compact, since the active region runs through the entire solid state medium, since the temperature adjustment takes place only within the active region and since external actuators and mirrors are not required.

Figure 3:
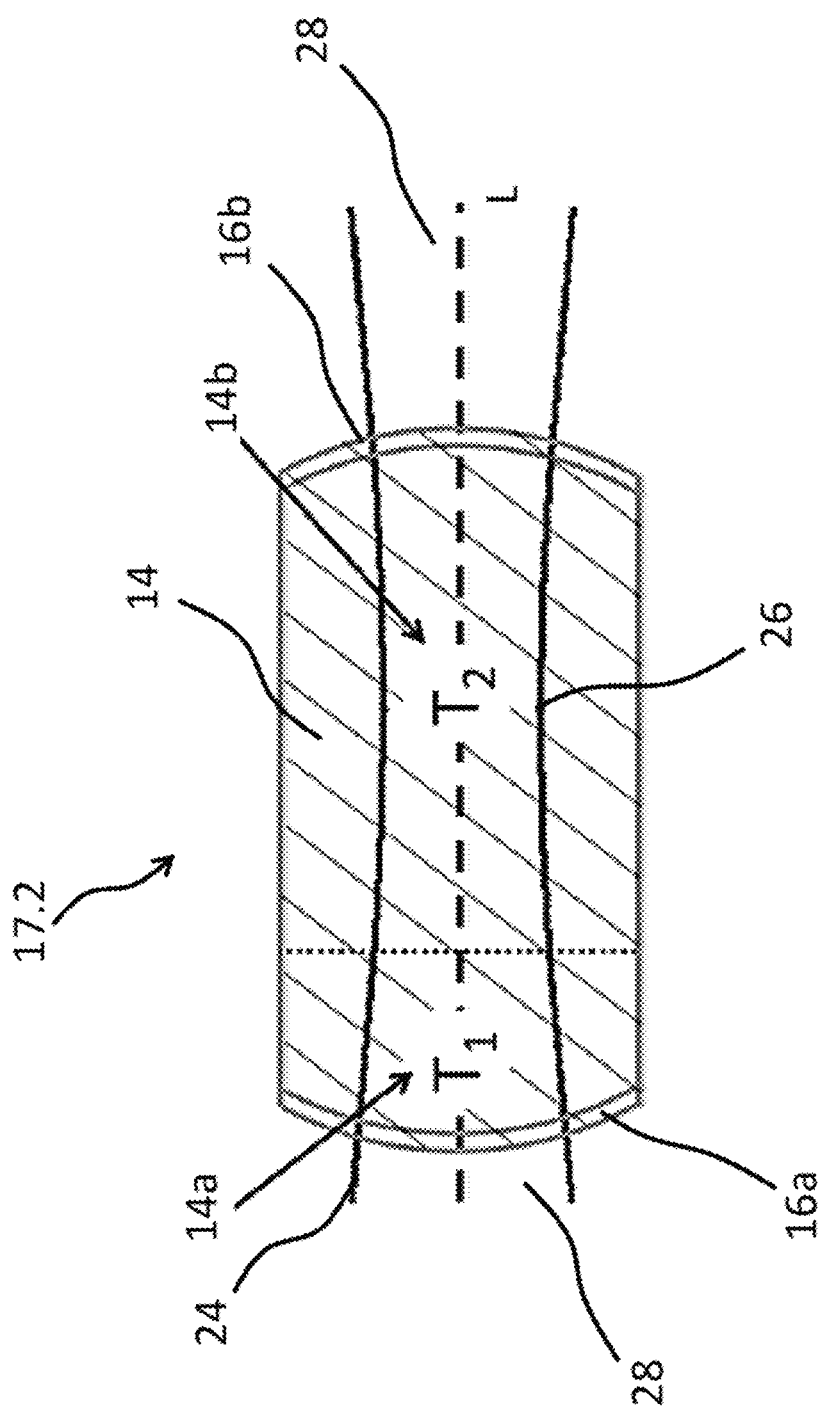
FIG. 3 illustrates a schematic sectional view of another embodiment of a nonlinear resonator.

The embodiment of a nonlinear resonator 17.2 shown in FIG. 3 differs from the resonator 17.1 shown in FIG. 2 in that the nonlinear solid state medium 14 comprises merely two sections 14a, 14b of different temperature. The temperature T1 in the first section 14a is used to control the resonance of a first wavelength. The temperature T2 is again controlled to the phase matching temperature. This design is simpler due to the absence of a third temperature section and is sufficient if the resonator is to support only one of the wavelengths.

Figure 4:
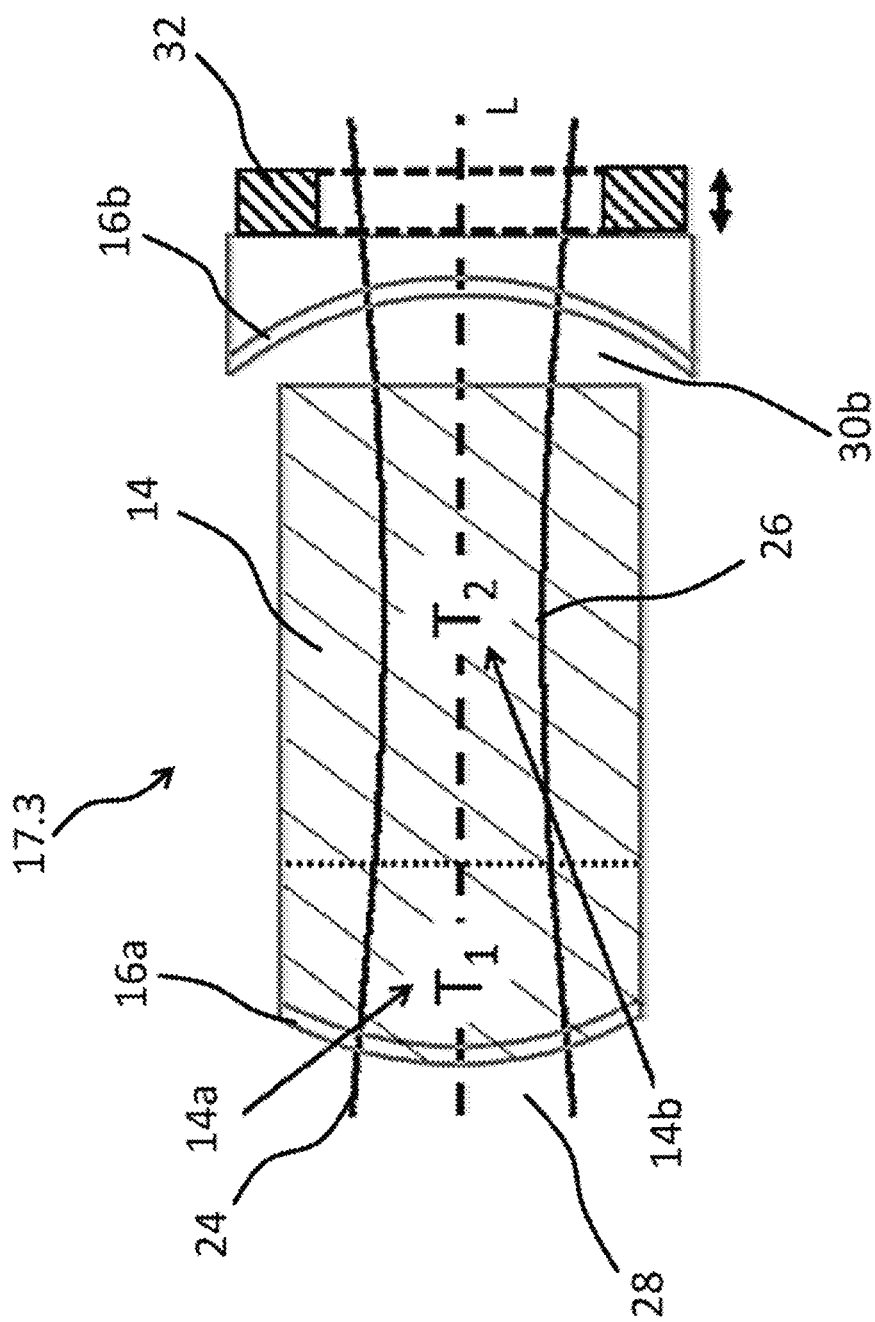
FIG. 4 illustrates a schematic sectional view of another embodiment of a nonlinear resonator.

The embodiment of a nonlinear resonator 17.3 shown in FIG. 4 differs from the resonator 17.2 shown in FIG. 3 in that the solid state medium 14 is provided with a mirror surface as resonator mirror 16a on only one side. The other resonator mirror 16b is here spaced from the solid-state medium 14 by an air gap 30 and is adjustable along the longitudinal axis L by a piezoelectric actuator 32, as indicated by the double arrow. It is thus a semi-monolithic resonator. The end of the solid-state medium 14 facing the resonator mirror 16b is not convex in this design and is provided with an anti-reflective coating not shown. This ensures that the laser radiation can reach the resonator mirror 16b and is reflected back into the solid state medium. By means of the piezoelectric actuator 32 the distance of the resonator mirror 16b to the resonator mirror 16a and thus the resonator length can be changed, whereby the width of the air gap 30 changes. The length of the resonator 17.3 in this example can therefore be kept resonant for one or two wavelengths both via the temperature T1 and via the piezoelectric actuator 32. If the target is only the resonance of one wavelength, the piezoelectric actuator allows a fast actuation during operation with low voltage. A high voltage is not necessary, since strong—but slow changes in length are caused by temperature T1.

Figure 5:
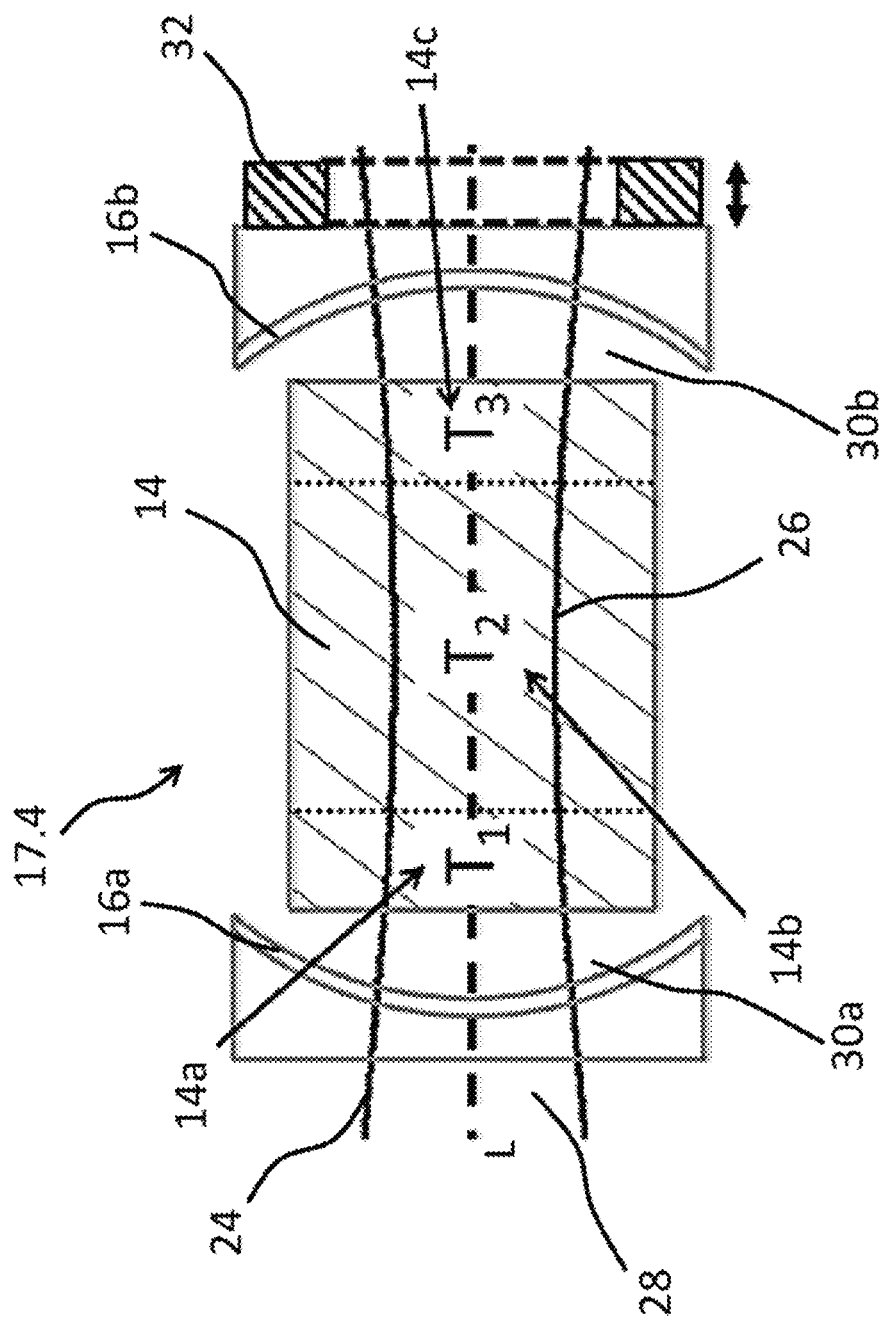
FIG. 5 illustrates a schematic sectional view of another embodiment of a nonlinear resonator.

The embodiment of a nonlinear resonator 17.4 shown in FIG. 5 differs from the resonator 17.3 shown in FIG. 4 in that no mirror surfaces are provided on the solid state medium 14, but both resonator mirrors 16a, 16b are spaced from the solid state medium 14 by an air gap 30a, 30b respectively. In this example, only the resonator mirror 16b is adjustable along the longitudinal axis L by means of an, in particular piezoelectric, actuating element 32, and thus the air gap 30b is adjustable. However, it may be intended that the resonator mirror 16a also comprises an actuating element, in particular a piezoelectric actuating element, for changing the air gap 30a. It is therefore a non-monolithic resonator. In this embodiment, the end of the solid state medium 14 facing the resonator mirror 16a is also non-convex and has an anti-reflective, coating which is not shown. In addition, the solid state medium 14 is again divided into three sections 14a, 14b, 14c with separately controllable temperatures T1, T2, T3, as in the resonator 17.1 in FIG. 2. The length of the resonator 17.3 can be kept at resonance for up to three wavelengths via the temperature T1, the temperature T2 and the piezoelectric actuator 32.

Figure 6:
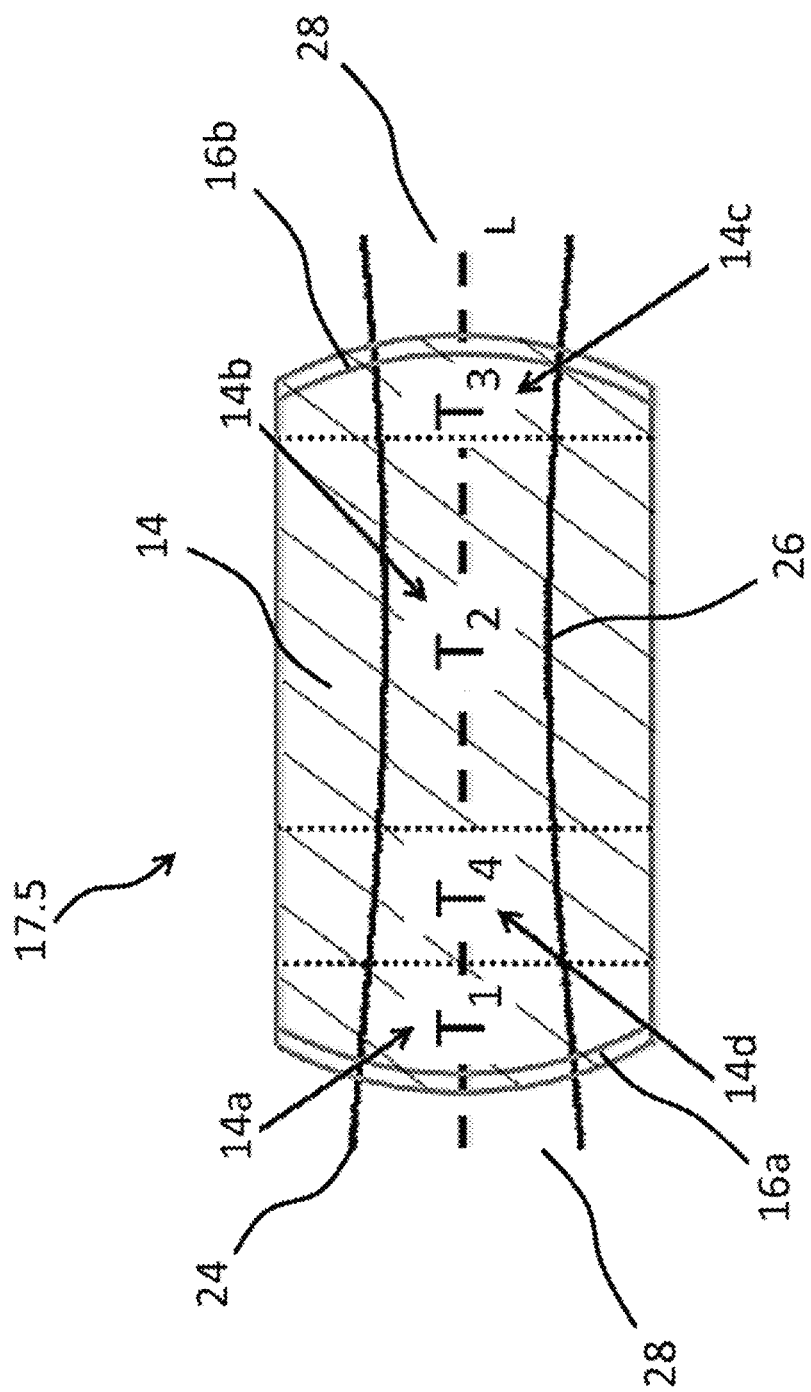
FIG. 6 illustrates a schematic sectional view of another embodiment of a nonlinear resonator.

The embodiment of a nonlinear resonator 17.5 shown in FIG. 6 differs from the resonator 17.1 shown in FIG. 2 in that the solid state medium 14 includes a further section 14d with separate temperature control. A further, not shown, temperature actuator controls the resonator length via temperature T4 to resonance for a further, third wavelength. This is useful, for example, for a sum frequency generation.

Figure 7:
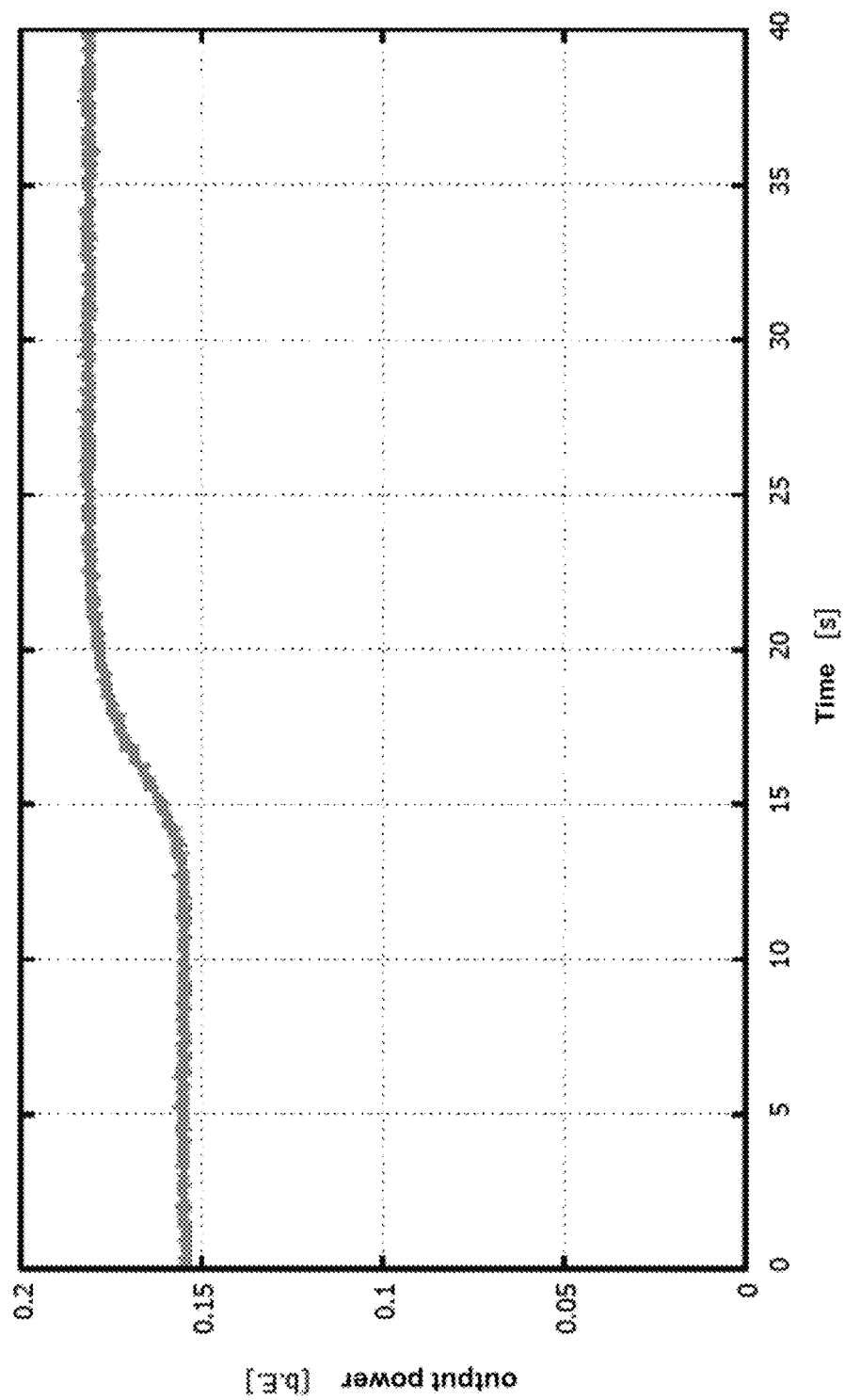
FIG. 7 illustrates an example of a measurement curve of the output power over time of the embodiment of the resonator of FIG. 4.

FIG. 7 shows a graph of the output power of a nonlinear resonator as shown in FIG. 4, showing the power of frequency-doubled light at 775 nm plotted over time. The resonator supports 1550 nm and 775 nm. The position of the mirror 16b was kept at resonance for 775 nm during the entire measurement period. T2 as well as T1 were kept at the phase matching temperature. The incident light at 1550 nm was close to resonance but not exact. In second 13, T1 was minimally changed and thus the resonance for 1550 nm was optimized. As a consequence, the efficiency increases, i.e. the output power at constant input power. In this example, the light output increases by about 15%. The value in this example is moderate, because by chance an operating point close to the optimal parameter set already existed before the optimization of T1.

Figure 8:
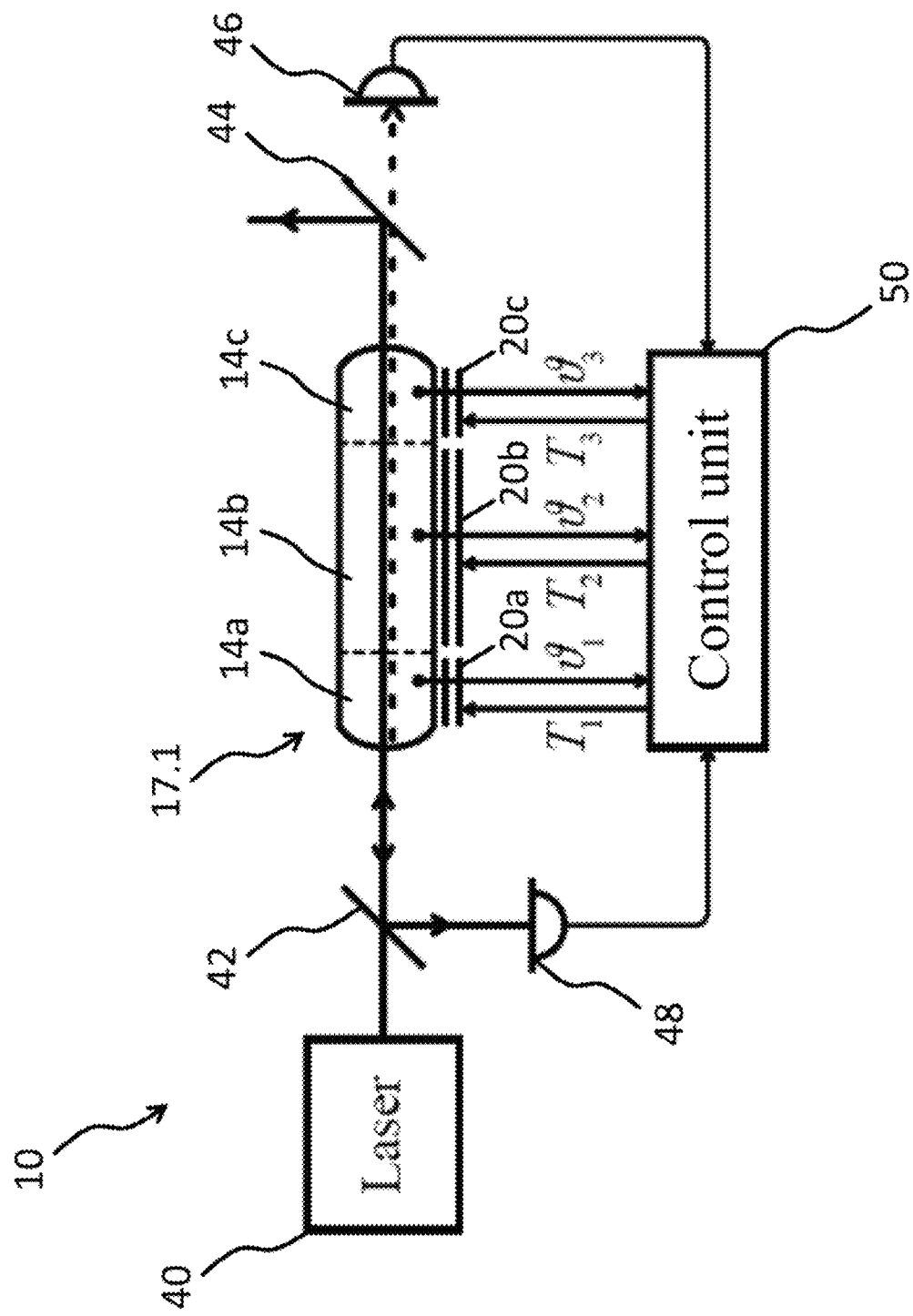
FIG. 8 illustrates an example of a temperature control scheme for the embodiment of the resonator of FIG. 2.

FIG. 8 shows a control scheme for the nonlinear resonator 17.1 according to FIG. 2 for controlling, the temperatures to their respective setpoints T1, T2, T3. The device 10 comprises a laser source 40, via which the pump beam is incident into the nonlinear resonator 17.1. The pump beam passes through a partially transparent mirror 42, enters the resonator 17.1 and generates the desired laser radiation. Part of the laser radiation is coupled out of the resonator and guided out of device 10 via a partially transparent mirror 44. Part of the laser radiation thus decoupled passes through the partially transparent mirror 44 and is guided to a first measuring device 46. In addition, a further part of the generated laser radiation is decoupled from the resonator 17.1 in the direction of the partially transparent mirror 42 and guided through this to a second measuring device 48. The middle section 14b of the solid state medium 14 of the resonator 17.1 is kept at a constant temperature T2. The temperature is measured at this section. A control unit 50 determines any deviation between the measured temperature value ϑ2 and the setpoint value T2 and, to compensate for the deviation, controls the temperature actuator 20b to heat or cool section 14b until T2=ϑ2 applies. The two outer sections 14a, 14c can be controlled independently of each other in the same way, i.e. each with a (different) static setpoint value for the temperatures T1, T3. The deviation of the measured values ϑ1, ϑ3 from the target values T1, T3 is then determined and subsequently readjusted. The two sections 14a, 14c can alternatively be controlled more effectively by dynamic feedback. In this case, the respective setpoint values T1, T3 of the temperature control are dynamically adjusted to the changing external conditions, e.g. the change of the incident wavelength. The information whether and in which direction a wavelength moves away from the resonance can be obtained by detecting a part of the generated laser radiation. For this purpose, the frequency detunings of resonance detected at the measuring devices 46, 48 are evaluated by known methods, e.g. according to Pound, Dreyer and Hall. This control method can also be used for the nonlinear resonators 17.2, 17.3, 17.4 and 17.5 with appropriate modifications.

The phase matching and the optical resonator length(s) for the wavelengths involved can be simultaneously adjusted to optimal values with the device or method according to the invention, which significantly increases the efficiency of frequency conversion. In particular, this is independent of the geometrical shape of the resonator. With the device or method according to the invention, frequency doubling, sum-frequency generation and frequency mixing can be achieved in addition to optically parametric processes, such as in particular the generation of squeezed light. Two or three copropagating wavelengths can be involved, whose simultaneous resonance (together with phase matching) increases the efficiency.

The work that led to this invention was funded by the European Research Council under the Seventh Framework Programme of the European Union (FP7/2007-2013)/ERC grant agreement No. 339897.

The invention claimed is:

1. A method for generating laser radiation using a temperature-controlled optical setup, the method comprising:
   providing a resonator comprising,
      an optically non-linear solid state medium having an active region;

introducing pump beam radiation into the optically non-linear solid state medium of the resonator;
generating outgoing wavelengths of laser radiation from the optically non-linear solid state medium of the resonator;
adjusting a resonator length by setting a first temperature value within a first section of an active region of the resonator; and
matching phases of the generated wavelengths and wavelengths of the introduced pump beam radiation by setting a second temperature value within a second section of the active region of the resonator,
wherein the active region extends over an entire optically non-linear solid state medium.

2. The method according to claim 1, wherein the resonator comprises a first resonator mirror and a second resonator mirror arranged at opposite ends of the optically non-linear solid state medium.

3. The method according to claim 2, wherein the first and second resonator mirrors are mirror surfaces positioned on outer sides of opposite ends of the optically non-linear solid state medium.

4. A method for generating laser radiation using a temperature-controlled optical setup, the method comprising:
providing a resonator comprising,
an optically non-linear solid state medium having an active region,
a first resonator mirror, and
a second resonator mirror;
introducing pump beam radiation into the optically non-linear solid state medium of the resonator;
generating outgoing wavelengths of laser radiation from the optically non-linear solid state medium of the resonator;
adjusting a resonator length by setting a first temperature value within a first section of an active region of the resonator; and
matching phases of the generated wavelengths and wavelengths of the introduced pump beam radiation by setting a second temperature value within a second section of the active region of the resonator,
wherein the first and second resonator mirrors are separate from the optically non-linear solid state medium, and wherein at least one adjusting element is provided and configured to adjust a distance of at least one of the first resonator mirror and the second resonator mirror from the optically non-linear solid state medium.

5. A method for generating laser radiation using a temperature-controlled optical setup, the method comprising:
providing a resonator comprising,
an optically non-linear solid state medium having an active region,
a first resonator mirror, and
a second resonator mirror;
introducing pump beam radiation into the optically non-linear solid state medium of the resonator;
generating outgoing wavelengths of laser radiation from the optically non-linear solid state medium of the resonator;
adjusting a resonator length by setting a first temperature value within a first section of an active region of the resonator; and
matching phases of the generated wavelengths and wavelengths of the introduced pump beam radiation by setting a second temperature value within a second section of the active region of the resonator,
wherein the first resonator mirror is a mirror surface on an outside surface of a first end of the optically non-linear solid state medium and the second resonator mirror is positioned proximate an opposing second end of the optically non-linear solid state medium and spaced apart from the optically non-linear solid state medium, and wherein an adjusting element is provided and configured to adjust a distance of the second resonator mirror from the optically non-linear solid state medium.

6. A method for generating laser radiation using a temperature-controlled optical setup, the method comprising:
providing a resonator comprising an optically non-linear solid state medium having an active region;
introducing pump beam radiation into the optically non-linear solid state medium of the resonator;
generating outgoing wavelengths of laser radiation from the optically non-linear solid state medium of the resonator;
adjusting a resonator length by setting a first temperature value within a first section of an active region of the resonator;
matching phases of the generated wavelengths and wavelengths of the introduced pump beam radiation by setting a second temperature value within a second section of the active region of the resonator; and
adjusting the resonator length by regulating a third temperature within a third section of the active region of the resonator.

7. The method according to claim 6, wherein the active region extends over the optically non-linear solid state medium.

8. The method according to claim 6, further comprising adjusting the resonator length by regulating a fourth temperature within a fourth section of the active region of the resonator.

9. The method according to claim 6, wherein at least one of the first temperature value and the second temperature value is controlled to a setpoint value, wherein the setpoint value is influenced by a frequency of the pump beam radiation.

10. A device for generating laser radiation, the device comprising:
a temperature-controlled optical setup comprising,
an optically non-linear solid state medium arranged in a resonator, and
an active region, wherein outgoing laser radiation is generated from a pump beam introduced into the optically non-linear solid state medium; and
a first temperature actuator and a second temperature actuator, wherein the first and second temperature actuators are configured to independently adjust temperature values in the active region of the optically non-linear solid state medium,
wherein the first temperature actuator is configured regulate a length of the resonator by setting a first temperature value within a first portion of the active region, and wherein the second temperature actuator is configured to match phases of wavelengths generated and phases of wavelengths of pump beam radiation by setting a second temperature value within a second portion of the active region, and
wherein the active region extends over an entire optically non-linear solid state medium.

11. The device according to claim 10, wherein the resonator comprises a first resonator mirror and a second resonator mirror, wherein the first and second resonator mirrors are positioned at opposite ends of the optically non-linear solid state medium.

12. The device according to claim 11, wherein the first and second resonator mirrors are mirror surfaces on an outside surface of the opposite ends of the optically non-linear solid state medium.

13. A device for generating laser radiation, the device comprising:
  a temperature-controlled optical setup comprising,
    an optically non-linear solid state medium arranged in a resonator, and
    an active region, wherein outgoing laser radiation is generated from a pump beam introduced into the optically non-linear solid state medium, and wherein the resonator comprises a first resonator mirror and a second resonator mirror; and
  a first temperature actuator and a second temperature actuator, wherein the first and second temperature actuators are configured to independently adjust temperature values in the active region of the optically non-linear solid state medium,
  wherein the first temperature actuator is configured to regulate a length of the resonator by setting a first temperature value within a first portion of the active region, and wherein the second temperature actuator is configured to match phases of wavelengths generated and phases of wavelengths of the pump beam radiation by setting a second temperature value within a second portion of the active region, and
  wherein at least one of the first resonator mirror and the second resonator mirror are spaced apart from the optically non-linear solid state medium, and wherein at least one adjusting element is configured to adjust distance of the at least one of the first resonator mirror and the second resonator mirror from the optically non-linear solid state medium.

14. The device according to claim 13, further comprising a control unit configured to regulate at least one of the first temperature and the second temperature to a specified value, wherein the specified value is dependent on a frequency of the pump beam.

15. A device for generating laser radiation, the device comprising:
  a temperature-controlled optical setup comprising,
    an optically non-linear solid state medium arranged in a resonator, and
    an active region, wherein outgoing laser radiation is generated from a pump beam introduced into the optically non-linear solid state medium, and wherein the resonator comprises a first resonator mirror and a second resonator mirror; and
  a first temperature actuator and a second temperature actuator, wherein the first and second temperature actuators are configured to independently adjust temperature values in the active region of the optically non-linear solid state medium,
  wherein the first temperature actuator is configured regulate a length of the resonator by setting a first temperature value within a first portion of the active region, and wherein the second temperature actuator is configured to match phases of wavelengths generated and phases of wavelengths of the pump beam radiation by setting a second temperature value within a second portion of the active region, and
  wherein the first resonator mirror is a mirror surface positioned on an outside surface of a first end of the optically non-linear solid state medium and the second resonator mirror is positioned a second, opposing end of the optically non-linear solid state medium and spaced apart from the optically non-linear solid state medium, and wherein an adjusting element is configured to adjust a distance between the second resonator mirror and the optically non-linear solid state medium.

16. A device for generating laser radiation, the device comprising:
  a temperature-controlled optical setup comprising an optically non-linear solid state medium arranged in a resonator and an active region, wherein outgoing laser radiation is generated from a pump beam introduced into the optically non-linear solid state medium;
  a first temperature actuator and a second temperature actuator, wherein the first and second temperature actuators are configured to independently adjust temperature values in the active region of the optically non-linear solid state medium; and
  a third temperature actuator configured to adjust a length of the resonator by adjusting a third temperature value within a third portion of the active region,
  wherein the first temperature actuator is configured regulate the length of the resonator by setting a first temperature value within a first portion of the active region, and wherein the second temperature actuator is configured to match phases of wavelengths generated and phases of wavelengths of the pump beam radiation by setting a second temperature value within a second portion of the active region.

17. The device according to claim 16, wherein the active region extends over an entire optically non-linear solid state medium.

18. The device according to claim 16, further comprising a fourth temperature actuator configured to adjust the length of the resonator by adjusting a fourth temperature value within a fourth portion of the active region of the resonator.

* * * * *